(12) United States Patent
Hirose et al.

(10) Patent No.: US 10,830,329 B2
(45) Date of Patent: Nov. 10, 2020

(54) BICYCLE SPROCKET

(71) Applicant: Shimano, Inc., Sakai-shi, Osaka (JP)

(72) Inventors: Yuki Hirose, Sakai (JP); Atsuhiro Emura, Sakai (JP); Shingo Shiraishi, Sakai (JP); Kenichi Akanishi, Sakai (JP)

(73) Assignee: Shimano Inc., Osaka (JP)

( * ) Notice: Subject to any disclaimer, the term of this patent is extended or adjusted under 35 U.S.C. 154(b) by 329 days.

(21) Appl. No.: 15/916,080

(22) Filed: Mar. 8, 2018

(65) Prior Publication Data

US 2019/0277386 A1 Sep. 12, 2019

(51) Int. Cl.
| | |
|---|---|
| *F16H 55/30* | (2006.01) |
| *F16H 55/06* | (2006.01) |
| *B62M 9/12* | (2006.01) |
| *B62M 1/36* | (2013.01) |

(52) U.S. Cl.
CPC ............. *F16H 55/30* (2013.01); *F16H 55/06* (2013.01); *B62M 1/36* (2013.01); *B62M 9/12* (2013.01)

(58) Field of Classification Search
CPC ......... F16H 55/30; B62M 9/10; B62M 9/105; B62M 9/00; B62M 2009/002
USPC ................................. 474/152, 156
See application file for complete search history.

(56) References Cited

U.S. PATENT DOCUMENTS

| | | | | |
|---|---|---|---|---|
| 586,991 | A * | 7/1897 | Curley | F16H 55/30 474/156 |
| 596,289 | A * | 12/1897 | Smith | F16H 9/04 474/141 |
| 3,168,836 | A * | 2/1965 | Militana | F16H 55/12 474/152 |
| 3,375,022 | A * | 3/1968 | Hattan | B62M 9/08 280/238 |
| 4,181,034 | A * | 1/1980 | Daniel | B62M 9/08 474/141 |
| 4,594,910 | A * | 6/1986 | Nagano | B62M 9/105 74/594.1 |

(Continued)

FOREIGN PATENT DOCUMENTS

| | | |
|---|---|---|
| CN | 1126684 A | 7/1996 |
| CN | 102910248 A | 2/2013 |

(Continued)

*Primary Examiner* — Henry Y Liu
(74) *Attorney, Agent, or Firm* — Alleman Hall Creasman & Tuttle LLP

(57) ABSTRACT

A bicycle sprocket includes a sprocket body, a tooth ring, and at least one non-threaded fastener. The sprocket body is made of a first material and has a rotational center axis. A central portion of the sprocket body has a central opening through which the rotational center axis passes. The sprocket body further includes a plurality of arm portions that extend radially outward from the central portion with respect to the rotational center axis. Each arm portion includes a sprocket body attachment portion. The tooth ring is made of a second material different from the first material and includes an annular portion. The annular portion includes a plurality of tooth ring attachment portions and a plurality of chain-driving teeth extending radially outward from the annular portion. The non-threaded fastener fixedly connects a sprocket body attachment portion and to a corresponding tooth ring attachment portion.

19 Claims, 9 Drawing Sheets

(56) References Cited

U.S. PATENT DOCUMENTS

| | | | | |
|---|---|---|---|---|
| 4,608,878 A * | 9/1986 | Shimano | B62K 19/34 | 474/152 |
| 5,738,603 A * | 4/1998 | Schmidt | B62M 9/10 | 474/158 |
| 7,108,622 B2 * | 9/2006 | Okabe | F16G 13/06 | 474/152 |
| 7,125,356 B2 * | 10/2006 | Todd | F16H 55/30 | 474/152 |
| 7,686,721 B2 * | 3/2010 | Tabe | B62M 9/105 | 474/116 |
| 7,691,020 B2 * | 4/2010 | Sakura | F16H 7/06 | 474/152 |
| 7,871,347 B2 * | 1/2011 | Kamada | B62M 9/10 | 474/152 |
| 7,967,709 B2 * | 6/2011 | Emura | B62M 9/105 | 474/160 |
| 8,177,670 B2 * | 5/2012 | Kamada | B62M 9/10 | 474/155 |
| 8,517,874 B2 * | 8/2013 | Reiter | B62M 9/10 | 474/160 |
| 8,573,093 B2 * | 11/2013 | Valle | B62M 3/00 | 474/160 |
| 9,162,729 B2 * | 10/2015 | Valle | B62M 3/00 | |
| 9,243,691 B2 * | 1/2016 | Yang | F16H 9/04 | |
| 9,255,629 B2 * | 2/2016 | Yang | B62M 1/105 | |
| 9,297,452 B2 * | 3/2016 | Iwai | F16H 55/30 | |
| 9,302,736 B2 * | 4/2016 | Iwai | B62M 9/105 | |
| 9,394,986 B2 * | 7/2016 | Pfeiffer | B62M 9/105 | |
| 9,403,578 B1 * | 8/2016 | Yoshida | B62M 9/10 | |
| 9,540,070 B2 * | 1/2017 | Watarai | B62M 9/02 | |
| 10,150,533 B1 * | 12/2018 | Hara | B62M 3/00 | |
| 10,247,291 B2 * | 4/2019 | Akanishi | F16H 55/303 | |
| 10,302,184 B2 * | 5/2019 | Yokozawa | F16H 55/06 | |
| 10,359,106 B2 * | 7/2019 | Akanishi | B62M 9/10 | |
| 10,377,445 B2 * | 8/2019 | Hirose | B62M 9/12 | |
| 10,507,888 B2 * | 12/2019 | Sugimoto | B62M 9/105 | |
| 2003/0199351 A1 * | 10/2003 | Nichols | B62M 9/10 | 474/160 |
| 2004/0092352 A1 * | 5/2004 | Chiang | B62M 9/10 | 474/160 |
| 2005/0079940 A1 * | 4/2005 | Reiter | F16H 55/30 | 474/160 |
| 2005/0119079 A1 * | 6/2005 | Okabe | F16G 13/06 | 474/155 |
| 2005/0233850 A1 * | 10/2005 | Andel | F16H 55/06 | 474/152 |
| 2006/0205549 A1 * | 9/2006 | Nonoshita | B62M 9/105 | 474/160 |
| 2007/0087878 A1 * | 4/2007 | Ogawa | F16H 55/30 | 474/156 |
| 2007/0129193 A1 * | 6/2007 | Nonoshita | B62M 9/105 | 474/160 |
| 2007/0246908 A1 * | 10/2007 | Shu | B62M 9/00 | 280/261 |
| 2007/0265122 A1 * | 11/2007 | Emura | B62M 9/105 | 474/152 |
| 2007/0270260 A1 * | 11/2007 | Latham | F16H 55/30 | 474/152 |
| 2008/0161145 A1 * | 7/2008 | Shiraishi | B62J 13/00 | 474/145 |
| 2008/0161146 A1 * | 7/2008 | Shiraishi | B62M 9/12 | 474/160 |
| 2008/0202284 A1 * | 8/2008 | Valle | B62M 3/00 | 74/594.1 |
| 2008/0312016 A1 * | 12/2008 | Chiang | B62M 9/105 | 474/116 |
| 2009/0098966 A1 * | 4/2009 | Kamada | B62M 9/10 | 474/160 |
| 2009/0280937 A1 * | 11/2009 | Greene | B62M 3/00 | 474/78 |
| 2011/0312457 A1 * | 12/2011 | Wang | F16H 55/06 | 474/152 |
| 2012/0244976 A1 * | 9/2012 | Lin | B62M 9/10 | 474/160 |
| 2013/0087013 A1 * | 4/2013 | Sugimoto | B62M 9/105 | 74/594.2 |
| 2013/0143704 A1 * | 6/2013 | Blank | B62M 9/10 | 474/161 |
| 2014/0335983 A1 * | 11/2014 | Iwai | B62M 9/105 | 474/78 |
| 2014/0335986 A1 * | 11/2014 | Iwai | B62M 9/105 | 474/155 |
| 2014/0335987 A1 * | 11/2014 | Iwai | F16H 55/303 | 474/161 |
| 2015/0094179 A1 * | 4/2015 | Iwai | F16H 55/30 | 474/152 |
| 2015/0210352 A1 * | 7/2015 | Sugimoto | B62M 9/105 | 474/80 |
| 2015/0210353 A1 * | 7/2015 | Tokuyama | B62M 9/12 | 474/160 |
| 2015/0211623 A1 * | 7/2015 | Inui | F16H 55/30 | 474/152 |
| 2015/0217834 A1 * | 8/2015 | Iwai | B62M 9/105 | 474/152 |
| 2015/0226306 A1 * | 8/2015 | Pfeiffer | B62M 9/105 | 474/152 |
| 2015/0291255 A1 * | 10/2015 | Nishimoto | B62M 9/06 | 474/152 |
| 2015/0337943 A1 * | 11/2015 | Sugimoto | F16H 55/08 | 474/152 |
| 2015/0360749 A1 * | 12/2015 | Iwai | F16H 55/30 | 474/158 |
| 2016/0053882 A1 * | 2/2016 | Watarai | B62M 9/10 | 474/152 |
| 2016/0114859 A1 * | 4/2016 | Tsai | B62M 9/10 | 474/160 |
| 2016/0238122 A1 * | 8/2016 | Medaglia | F16H 55/30 | |
| 2017/0292598 A1 * | 10/2017 | Moore | B22D 21/007 | |
| 2017/0370460 A1 * | 12/2017 | Akanishi | F16H 55/30 | |

FOREIGN PATENT DOCUMENTS

| | | |
|---|---|---|
| CN | 105083461 A | 11/2015 |
| EP | 0047092 A2 | 3/1982 |
| EP | 0791532 A2 | 8/1997 |

\* cited by examiner

BICYCLE SPROCKET

BACKGROUND

When riding a bicycle, and in particular, when riding a mountain bike, it is desirable to have a sprocket that has strength and rigidity to withstand stress while driving a chain. For example, a rider may apply a strong pedaling force when riding a mountain bike, which places stress on the sprocket. This stress may be due to the chain inclination angle relative to the sprocket, and the stress may be unevenly displaced at certain areas around the sprocket. It is further desirable for the sprocket to be lightweight while maintaining strength and rigidity. For example, maneuvering a mountain bike may require agility, which is easier to achieve with a mountain bike comprising lightweight components. Mountain bikes are often used in off-road applications in which mud can become trapped around the teeth of the chain ring on the sprocket. A challenge exists in designing a sprocket that is strong, lightweight, and can readily eliminate mud.

SUMMARY

A bicycle sprocket developed to address the above identified issues is disclosed herein. In accordance with a first aspect of the present invention, a bicycle sprocket comprises a sprocket body, a tooth ring, and at least one non-threaded fastener. The sprocket body is made of a first material and has a rotational center axis. A central portion included in the sprocket body has a central opening through which the rotational center axis passes. The sprocket body further includes a plurality of arm portions that extend radially outward from the central portion with respect to the rotational center axis. Each of the arm portions includes a sprocket body attachment portion. The tooth ring is made of a second material that is different from the first material and includes an annular portion. The annular portion includes a plurality of tooth ring attachment portions and a plurality of chain-driving teeth extending radially outward from the annular portion to engage with a bicycle chain. The at least one non-threaded fastener fixedly connects a sprocket body attachment portion and to a corresponding tooth ring attachment portion.

With the bicycle sprocket according to the first aspect, it is possible to reduce the total weight of a sprocket while maintaining the necessary strength and rigidity.

In accordance with a second aspect of the present invention, a bicycle sprocket comprises a sprocket body and a tooth ring. The sprocket body has a rotational center axis, a first side surface, and a second side surface. The second side surface is opposite to the first side surface in an axial direction with respect to the rotational center axis. The second side surface is configured to face an axial center plane of a bicycle frame in a mounting state where the bicycle sprocket is mounted to the bicycle frame. The sprocket body includes a central portion having a central opening through which the rotational center axis passes and a plurality of arm portions extending radially outward from the central portion with respect to the rotational center axis. Each of the arm portions includes a sprocket body attachment portion. The tooth ring is provided separately from the sprocket body and includes an annular portion and a plurality of chain-driving teeth. The annular portion of the tooth ring is attached to the first side surface of the sprocket body and includes a plurality of tooth ring attachment portions that are non-detachably attached to the sprocket body attachment portions. The chain-driving teeth extend radially outward from the annular portion to engage with a bicycle chain.

With the bicycle sprocket according to the second aspect, it is possible to reduce the total weight of a sprocket, and it is possible to resist a bending stress caused by a chain inclination relative to the sprocket while driving a chain.

In accordance with a third aspect of the present invention, a bicycle sprocket comprises a sprocket body and a tooth ring. The sprocket body is made of a first material and has a rotational center axis. A central portion included in the sprocket body has a central opening through which the rotational center axis passes. The sprocket body further includes a plurality of arm portions that extend radially outward from the central portion with respect to the rotational center axis. Each of the arm portions includes a sprocket body attachment portion. The tooth ring is made of a second material that is different from the first material and includes an annular portion and a plurality of chain-driving teeth. The annular portion includes a plurality of tooth ring attachment portions. The chain-driving teeth extend radially outward from the annular portion to engage with a bicycle chain. The plurality of chain-driving teeth includes at least one first tooth having a first chain-engaging axial width, and at least one second tooth having a second chain-engaging axial width that is smaller than the first chain-engaging axial width. The at least one first tooth has a first maximum radial tooth length, and the at least one second tooth has a second maximum radial tooth length that is smaller than the first maximum radial tooth length.

With the bicycle sprocket according to the third aspect, it is possible to reduce the total weight of a sprocket, and it is possible to improve the chain holding performance.

In accordance with a fourth aspect of the present invention, a bicycle sprocket has a rotational center axis and comprises a plurality of chain-driving teeth. The plurality of chain-driving teeth includes at least one first tooth having a first chain-engaging axial width, and at least one second tooth having a second chain-engaging axial width that is smaller than the first chain-engaging axial width. The plurality of chain-driving teeth further includes a plurality of tooth tip portions and a plurality of tooth bottom portions, and each of the plurality of tooth bottom portions is located between a pair of tooth tip portions adjacent to each other in a circumferential direction with respect to the rotational center axis. The plurality of tooth bottom portions includes at least one first tooth bottom portion having a first tooth bottom shape, and at least one second tooth bottom portion having a second tooth bottom shape. The first tooth bottom shape is different from the second tooth bottom shape.

With the bicycle sprocket according to the fourth aspect, it is possible to effectively eliminate mud from a sprocket while maintaining the strength of the teeth.

In accordance with a fifth aspect of the present invention, the bicycle sprocket according to the fourth aspect is configured in a manner such that the first tooth bottom shape defines a first tooth bottom circle with a first diameter, and the second tooth bottom shape defines a second tooth bottom circle with a second diameter that is smaller than the first diameter.

With the bicycle sprocket according to the fifth aspect, it is possible to effectively eliminate mud from a sprocket while maintaining the strength of the teeth.

In accordance with a sixth aspect of the present invention, the bicycle sprocket according to the fifth aspect is configured in a manner such that the at least one second tooth bottom portion is disposed to overlap with a crank arm in an assembled state where the crank arm is mounted to the bicycle sprocket.

With the bicycle sprocket according to the sixth aspect, it is possible to strengthen an area of the sprocket to which a strong pedaling force is applied while improving the elimination of mud at another area of sprocket.

In accordance with a seventh aspect of the present invention, a bicycle sprocket has a rotational center axis and comprises a plurality of chain-driving teeth. The plurality of chain-driving teeth includes a plurality of tooth tip portions and a plurality of tooth bottom portions, and each of the plurality of tooth bottom portions is located between a pair of tooth tip portions adjacent to each other in a circumferential direction with respect to the rotational center axis. The plurality of tooth bottom portions includes at least one first tooth bottom portion having a first tooth bottom shape, and at least one second tooth bottom portion having a second tooth bottom shape. The first tooth bottom shape is different from the second tooth bottom shape. The first tooth bottom shape defines a first tooth bottom circle with a first diameter, and the second tooth bottom shape defines a second tooth bottom circle with a second diameter that is smaller than the first diameter. The at least one second tooth bottom portion is disposed to overlap with a crank arm in an assembled state where the crank arm is mounted to the bicycle sprocket.

With the bicycle sprocket according to the seventh aspect, it is possible to strengthen an area of the sprocket to which a strong pedaling force is applied while improving the elimination of mud at another area of sprocket.

In accordance with an eighth aspect of the present invention, the bicycle sprocket according to the first or third aspect is configured in a manner such that the sprocket body has a first side surface and a second side surface opposite to the first side surface in an axial direction with respect to the rotational center axis. The annular portion of the tooth ring is attached to the first side surface. The second side surface is configured to face an axial center plane of a bicycle frame in a mounting state where the bicycle sprocket is mounted to the bicycle frame.

With the bicycle sprocket according to the eighth aspect, it is possible to resist a bending stress caused by a chain inclination relative to the sprocket while driving a chain.

In accordance with a ninth aspect of the present invention, the bicycle sprocket according to any one of the first to third or eighth aspects is configured in a manner such that the sprocket body attachment portion has an axially recessed attachment surface on which the tooth-ring attachment portion is mounted.

With the bicycle sprocket according to the ninth aspect, it is possible to reduce the weight of part of the arm portions of the sprocket.

In accordance with a tenth aspect of the present invention, the bicycle sprocket according to any one of the first to third or eighth aspects is configured in a manner such that an axially recessed attachment surface of the sprocket body attachment portion is configured to face away from an axial center plane of a bicycle frame in a mounting state where the bicycle sprocket is mounted to the bicycle frame.

With the bicycle sprocket according to the tenth aspect, it is possible to resist a bending stress caused by a chain inclination relative to the sprocket while driving a chain.

In accordance with an eleventh aspect of the present invention, the bicycle sprocket according to the ninth or tenth aspect is configured in a manner such that the central portion of the sprocket body has an axial abutment surface configured to abut a crank arm, and the axially recessed attachment surface is offset from the axial abutment surface in an axial direction with respect to the rotational center axis by an axial distance that is equal to or larger than 4.5 mm.

With the bicycle sprocket according to the eleventh aspect, it is possible to reduce an inclination of the chain line engaged with the largest sprocket of the rear sprocket assembly and improve a chain driving efficiency.

In accordance with a twelfth aspect of the present invention, the bicycle sprocket according to any one of the first to third or eighth to eleventh aspects is configured in a manner such that the plurality of tooth ring attachment portions includes a first attachment portion, a second attachment portion, and a third attachment portion, and the annular portion of the tooth ring has a first inner periphery and a second inner periphery. The second attachment portion of the tooth-ring attachment portion is disposed between the first attachment portion and the third attachment portion in a circumferential direction with respect to the rotational center axis. The first inner periphery of the annular portion of the tooth ring is disposed between the first attachment portion and the second attachment portion in the circumferential direction. The second inner periphery of the annular portion of the tooth ring is disposed between the second attachment portion and the third attachment portion in the circumferential direction. A first radial distance is defined from the rotational center axis to the first inner periphery in a radial direction with respect to the rotational center axis. A second radial distance is defined from the rotational center axis to the second inner periphery in the radial direction. The first radial distance is different from the second radial distance.

With the bicycle sprocket according to the twelfth aspect, it is possible to reduce the total weight of a sprocket while maintaining the necessary strength and rigidity.

In accordance with a thirteenth aspect of the present invention, the bicycle sprocket according to the twelfth aspect is configured in a manner such that the plurality of tooth-ring attachment portions further includes a fourth attachment portion disposed between the third attachment portion and the first attachment portion in the circumferential direction, and the annular portion of the tooth ring has a third inner periphery and a fourth inner periphery. The third inner periphery is disposed between the third attachment portion and the fourth attachment portion in the circumferential direction, and the fourth inner periphery is disposed between the fourth attachment portion and the first attachment portion in the circumferential direction. A third radial distance is defined from the rotational center axis to the third inner periphery in the radial direction, and a fourth radial distance is defined from the rotational center axis to the fourth inner periphery in the radial direction. The third radial distance is equal to the first radial distance, and the fourth radial distance is equal to the second radial distance.

With the bicycle sprocket according to the thirteenth aspect, it is possible to improve the strength of a sprocket body at a predetermined area and reduce the total weight of the sprocket.

In accordance with a fourteenth aspect of the present invention, the bicycle sprocket according to the thirteenth aspect is configured in a manner such that a crank arm is mounted to the sprocket body in a manner such that the crank arm extends from the rotational center axis toward the third inner periphery in the radial direction as viewed from an axial direction with respect to the rotational center axis, and the second radial distance is smaller than the third radial distance.

With the bicycle sprocket according to the fourteenth aspect, it is possible to strengthen an area of the sprocket to which a strong pedaling force is applied.

In accordance with a fifteenth aspect of the present invention, the bicycle sprocket according to the fourteenth aspect is configured in a manner such that the first inner periphery, the second inner periphery, the third inner periphery, and the fourth inner periphery are symmetrically formed with respect to a longitudinal center plane of the crank arm.

With the bicycle sprocket according to the fifteenth aspect, it is possible to strengthen an area of the sprocket to which a strong pedaling force is applied.

In accordance with a sixteenth aspect of the present invention, the bicycle sprocket according to the fifteenth aspect is configured in a manner such that the first inner periphery has a first circumferential length, the second inner periphery has a second circumferential length that is smaller than the first circumferential length, the third inner periphery has a third circumferential length, and the fourth inner periphery has a fourth circumferential length that is smaller than the third circumferential length.

With the bicycle sprocket according to the sixteenth aspect, it is possible to strengthen an area of the sprocket to which a strong pedaling force is applied.

In accordance with a seventeenth aspect of the present invention, the bicycle sprocket according to any one of the first to third or eight to sixteenth aspects is configured in a manner such that the central portion of the sprocket has a torque transmitting profile configured to engage with one of a crank arm and a crank axle.

With the bicycle sprocket according to the seventeenth aspect, it is possible to transmit a pedaling force from the crank arm to the sprocket without using a fastener to fasten the sprocket to the crank arm.

In accordance with an eighteenth aspect of the present invention, the bicycle sprocket according to any one of the first, third or eighth aspects is configured in a manner such that the first material has a first wear resistance, and the second material has a second wear resistance that is greater than the first wear resistance.

With the bicycle sprocket according to the eighteenth aspect, it is possible to increase the longevity of a sprocket by improving the wear resistance of the teeth.

In accordance with a nineteenth aspect of the present invention, the bicycle sprocket according to any one of the first, third, or eighth aspects is configured in a manner such that the first material is selected from the group consisting of aluminum and plastic.

With the bicycle sprocket according to the nineteenth aspect, it is possible to reduce the weight of a sprocket body.

In accordance with a twentieth aspect of the present invention, the bicycle sprocket according to any one of the first, third or eighth aspects is configured in a manner such that the second material is selected from the group consisting of steel, titanium and aluminum.

With the bicycle sprocket according to the twentieth aspect, it is possible to increase the longevity of a sprocket by improving the wear resistance of the teeth.

In accordance with a twenty-first aspect of the present invention, the bicycle sprocket according to the first aspect further comprising at least one non-metallic cover concealing the at least one non-threaded fastener.

With the bicycle sprocket according to the twenty-first aspect, it is possible to prevent a non-threaded fastener from corroding.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure. The term "small and/or light vehicle," as used herein, refers to electric and non-electric vehicles regardless of the number of their wheels, but does not include four-wheeled vehicles having an internal combustion engine as a power source for driving the wheels, or four-wheeled electric vehicles that require a license to operate on public roads.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DETAILED DESCRIPTION OF EMBODIMENTS

Figure 1:
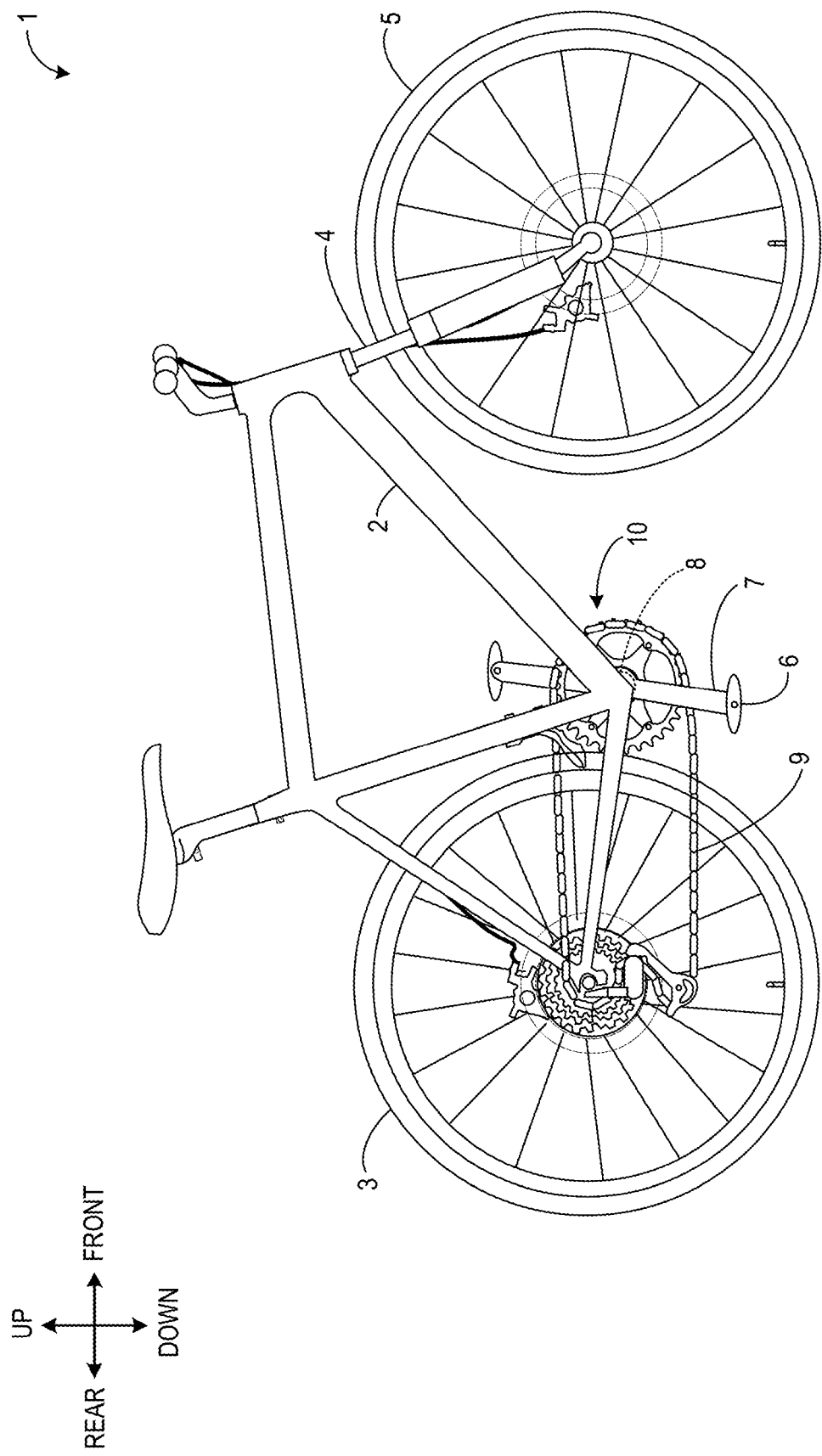
FIG. 1 is a right side elevation view of an example bicycle incorporating a bicycle sprocket according to the present disclosure.

Selected embodiments will now be explained with reference to the drawings, wherein like reference numerals designate corresponding or identical elements throughout the various drawings. It will be apparent to those skilled in the art from this disclosure that the following descriptions of the embodiments are provided for illustration only and not for the purpose of limiting the invention as defined by the appended claims and their equivalents.

Referring initially to FIG. 1, an exemplary bicycle 1 having a sprocket 10 in accordance with at least one disclosed embodiment of the present invention is shown. The bicycle 1 is, for example, an off-road bicycle such as a cyclocross bicycle or mountain bike. Alternatively, the bicycle 1 may be a road type bicycle. As shown in the schematic outline of FIG. 2, the bicycle 1 may have an axial center plane P1 defining left and right halves of the bicycle 1. The following directional terms "front," "rear," "forward," "rearward," "left," "right," "transverse," "upward," and "downward," as well as any other similar directional terms, refer to those directions which are determined on the basis of a rider sitting upright on a saddle of the bicycle 1 while facing a handlebar, for example.

Continuing with FIG. 1, the bicycle 1 includes a frame 2 attached to a rear wheel 3. A front fork 4 attaches a front wheel 5 to the frame 2. Pedals 6 on either side of the bicycle 1 are attached to corresponding crank arms 7. The crank arms 7 are mounted on either side of the frame 2 at 180 degrees from one another and are connected by a crank axle 8 (indicated by the dotted line). The bicycle 1 of the present embodiment is driven by a chain drive transmission system that includes a bicycle chain 9 engaged with one of a cassette of rear sprockets and a front bicycle sprocket 10. A driving force applied to the pedals 6 is transferred to the crank arms 7, which rotate the crank axle 8 and the bicycle sprocket 10. As the bicycle sprocket 10 rotates, the bicycle chain 9 is driven around the bicycle sprocket 10 and transmits power to the rear wheel 3 to propel the bicycle 1. Other parts of the bicycle 1 are well known and are not described herein.

Figure 2:
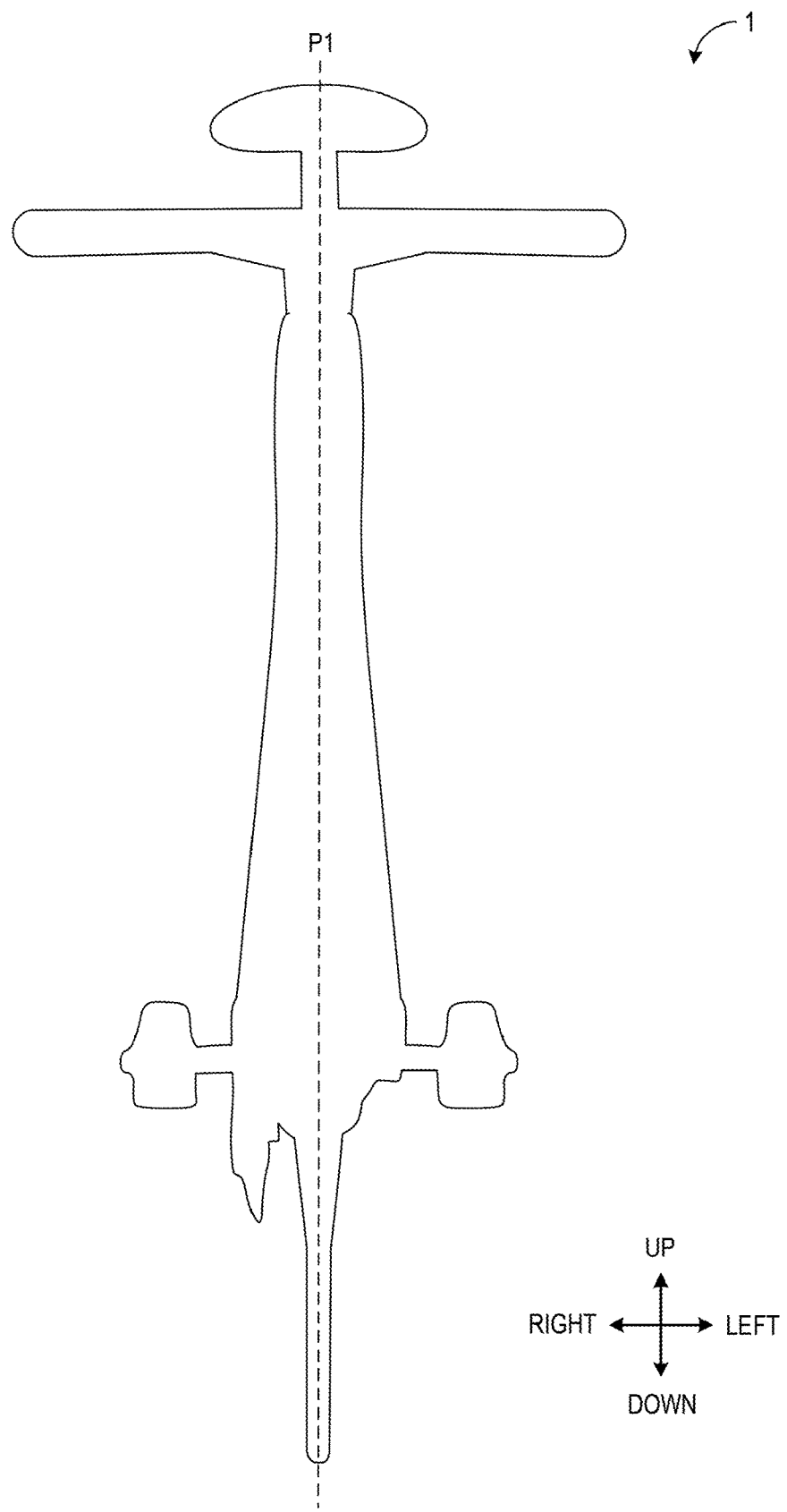
FIG. 2 is a schematic outline of the bicycle.
Figure 3:
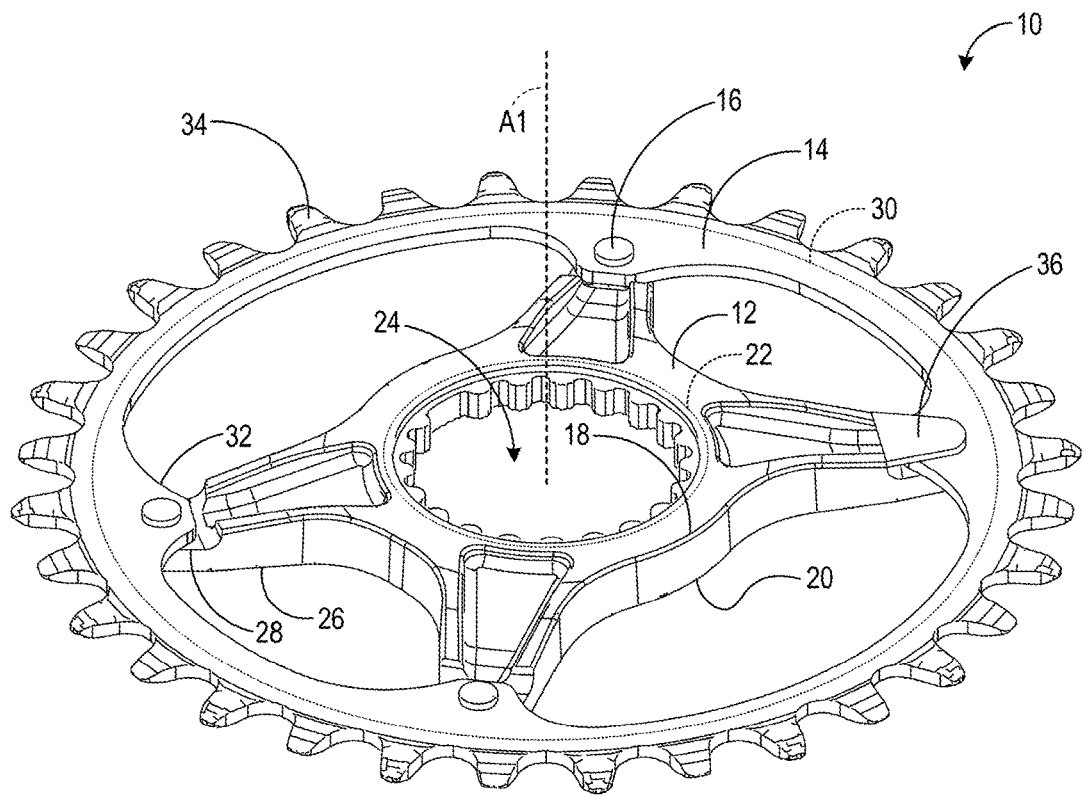
FIG. 3 is a right side perspective view of a bicycle sprocket according to the present disclosure.
Figure 4:
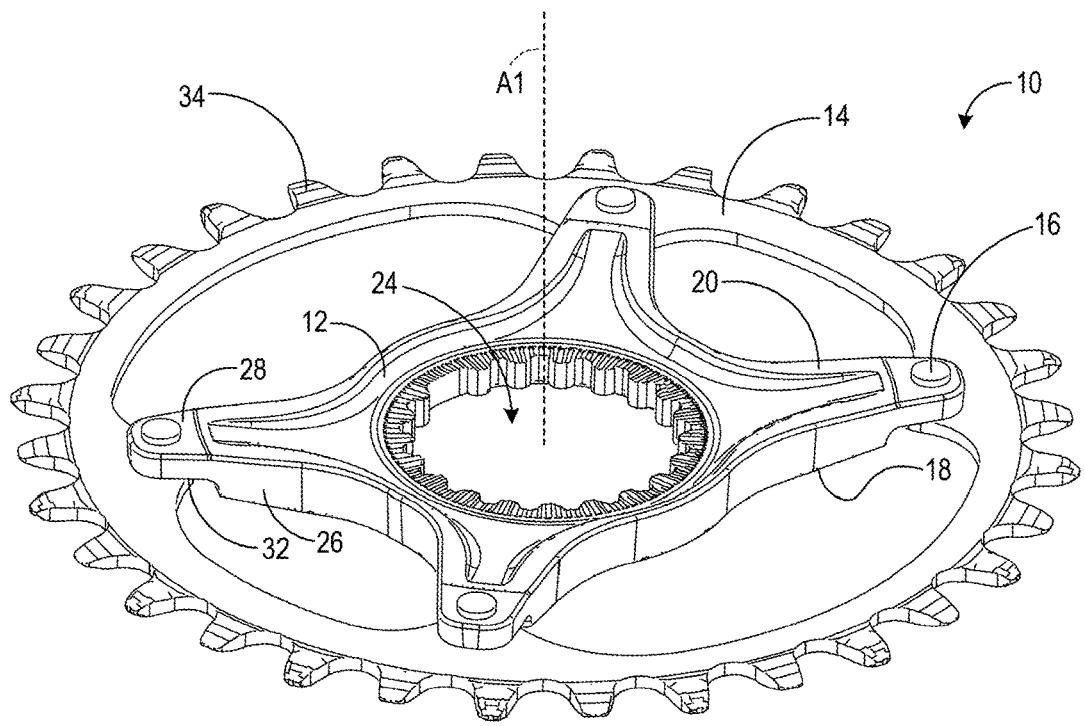
FIG. 4 is a left side perspective view of a bicycle sprocket according to the present disclosure.

FIG. 3 shows a right side perspective view of the bicycle sprocket 10, and FIG. 4 is a left side perspective view of the bicycle sprocket 10. The bicycle sprocket 10 is configured as a direct mount sprocket having a rotational center axis A1 and comprises a sprocket body 12, a tooth ring 14, and at least one non-threaded fastener 16. The sprocket body 12 has a first side surface 18, a second side surface 20, and the rotational center axis A1. It will be appreciated that the first side surface 18 of the sprocket body 12 corresponds to a right side surface, according to the perspective of a rider sitting upright on a saddle of the bicycle 1 while facing a handlebar, as shown in FIG. 2. The second side surface 20 is arranged opposite to the first side surface 18 in an axial direction, with respect to the rotational center axis A1. As such, the second side surface 20 is configured to face the axial center plane P1 of the bicycle frame 2 in a mounting state where the bicycle sprocket 10 is mounted to the bicycle frame 2. It will be appreciated that the second side surface 20 of the sprocket body 12 corresponds to a left side surface, according to the perspective of a rider sitting upright on a saddle of the bicycle 1 while facing a handlebar, as shown in FIG. 2.

A central portion 22 of the sprocket body 12 has a central opening 24 through which the rotational center axis A1 passes. A plurality of arm portions 26 extend radially outward from the central portion 22 with respect to the rotational center axis A1, and each of the arm portions 26 includes a sprocket body attachment portion 28. The tooth ring 14 includes an annular portion 30 including a plurality of tooth ring attachment portions 32 and a plurality of chain driving teeth 34. At least one non-threaded fastener 16 fixedly connects the sprocket body attachment portion 28 to a corresponding tooth ring attachment portion 32. In some embodiments, the bicycle sprocket 10 further comprises at least one non-metallic cover 36 concealing at least one non-threaded fastener 16, as shown in FIG. 3.

Figure 5:
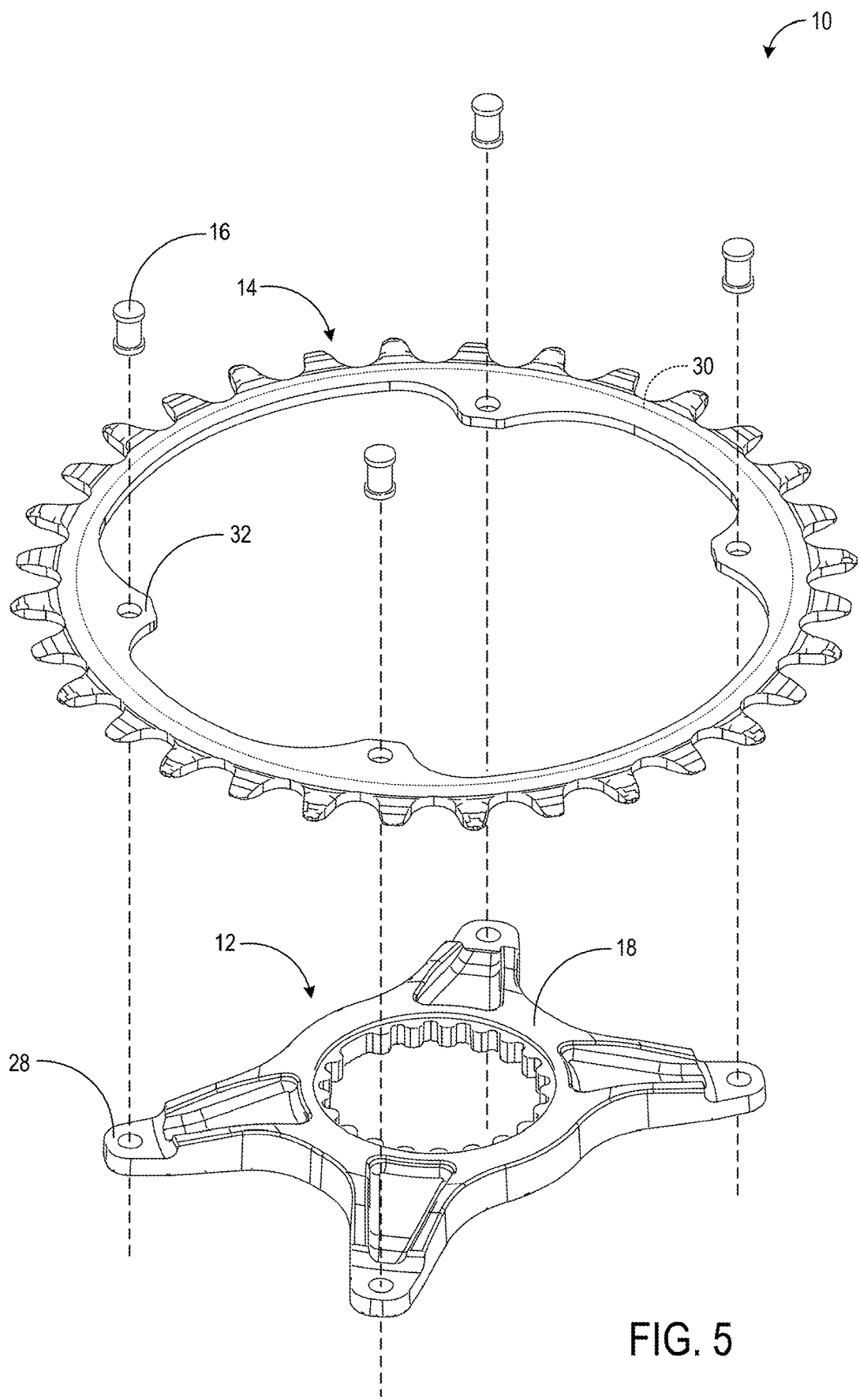
FIG. 5 is an exploded view of a bicycle sprocket according to the present disclosure.

Turning to FIG. 5, an exploded view of the bicycle sprocket 10 is shown. The dashed lines indicate the assembly path of the bicycle sprocket 10. The non-threaded fastener 16 is configured to concurrently penetrate a hole in the tooth ring attachment portion 32 of the tooth ring 14 and a hole in the sprocket body attachment portion 28 of the sprocket body 12. When the sprocket is assembled, the tooth ring attachment portions 32 are non-detachably attached to sprocket body attachment portions 28 in a manner such that the annular portion 30 of the tooth ring 14 is attached to the first side surface 18 of the sprocket body 12.

The term "non-detachably attached" or "non-detachably attaching," as used herein, encompasses configurations in which an element is directly attached to another element by directly affixing the element to the other element wherein the element cannot be detached from the other element without substantial damage that results from detachment of the element from the other element, and configurations in which the element is indirectly attached to the other element via intermediate member(s) wherein the element cannot be detached from the other element and the intermediate member(s) without substantial damage the results from detachment of the element from the other element. This concept also applies to words of similar meaning, for example, "non-detachably joined," "non-detachably connected," "non-detachably coupled," "non-detachably mounted," "non-detachably bonded," "non-detachably fixed," and their derivatives.

The non-threaded fasteners 16 are depicted as rivets in the illustrated embodiment; however, it will be appreciated that the non-threaded fasteners 16 may include or embody alternative attachment methods such as adhesive, bonding, or welding, for example. Further, while the illustrated embodiment shows four non-threaded fasteners 16, it will be appreciated that a different number of non-threaded fasteners 16 may be provided, such as one, two, three, five or more, for example.

As shown in FIG. 5, tooth ring 14 is separately provided from the sprocket body 12. The sprocket body 12 is made of a first material, and the tooth ring 14 is made of a second material that is different from the first material. The first material has a first wear resistance. The first material is selected from the group consisting of aluminum and plastic. Alternatively, the first material may be composed of a combination of aluminum and plastic. The second material has a second wear resistance that is greater than the first wear resistance. The second material is selected from the group consisting of steel, titanium, and aluminum. Additional features of the sprocket body 12 and the tooth ring 14 will be discussed in detail below.

Figure 7:
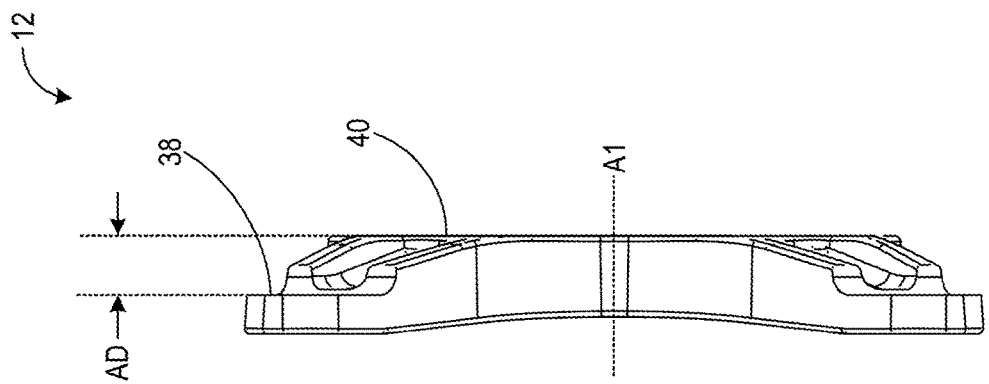
FIG. 7 is a rear view of a sprocket body according to the present disclosure.
Figure 6:
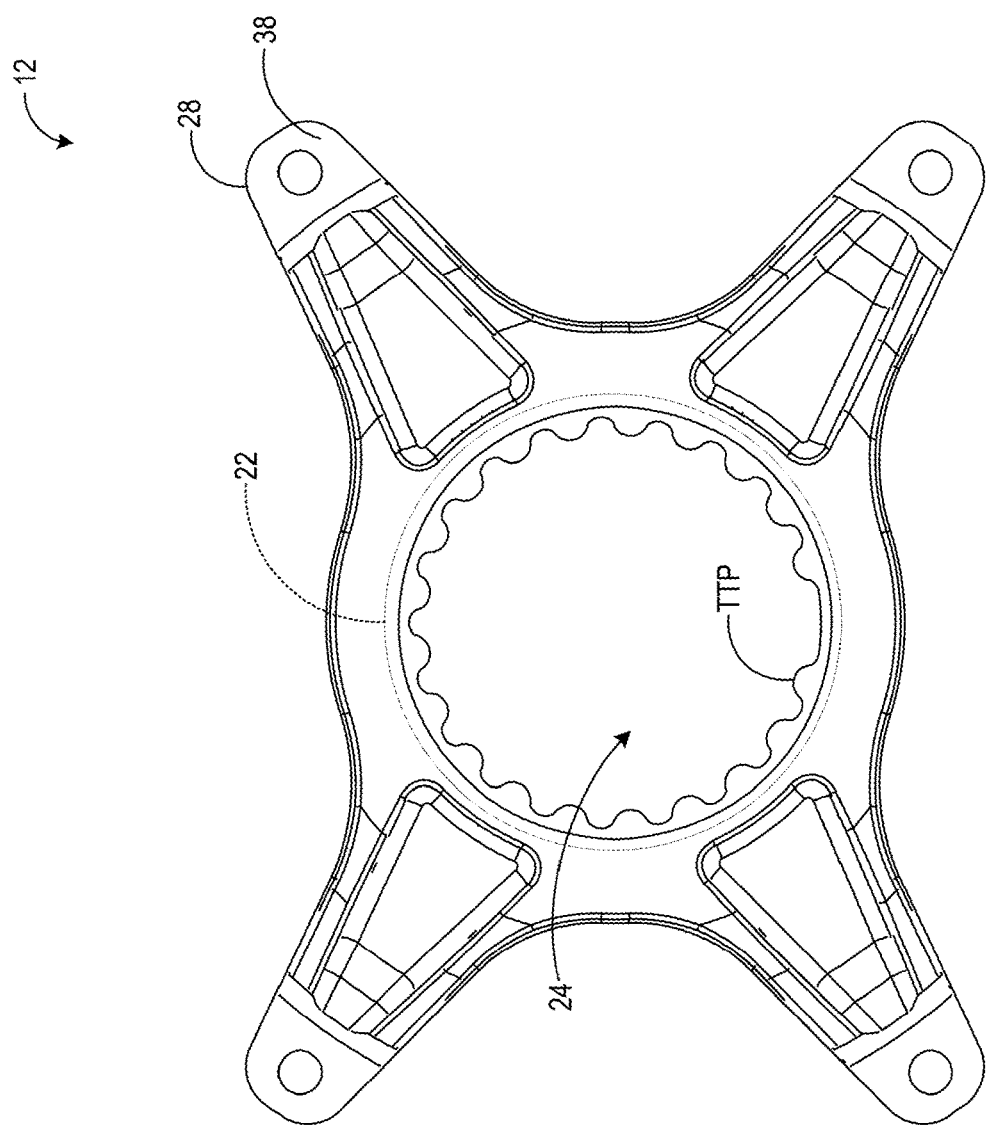
FIG. 6 is a right side view of a sprocket body according to the present disclosure.

FIGS. 6 and 7 show a right side view and a rear view of the sprocket body 12, respectively. As shown in FIG. 6 and discussed in detail below with reference to FIG. 10, the central opening 24 of the central portion 22 of the sprocket body 12 is formed to have splines, thereby providing a torque transmitting profile TTP that is configured to engage with one of a crank arm 7 and a crank axle 8.

As discussed above, the tooth ring 14 attaches to the sprocket body 12 at the sprocket body attachment portion 28. Accordingly, the sprocket body attachment portion 28 has an axially recessed attachment surface 38 on which the tooth ring attachment portion 32 is mounted. The axially recessed attachment surface 38 of the sprocket body attachment portion 28 is configured to face away from the axial center plane P1 of the bicycle frame 2 in a mounting state where the bicycle sprocket 10 is mounted to the bicycle frame 2. In contrast to the axially recessed attachment surface 38, the central portion 22 of the sprocket body 12 has an axial abutment surface 40. As indicated in FIG. 7, the axially recessed attachment surface 38 is offset from the axial abutment surface 40 in the axial direction with respect to the rotational center axis A1 by an axial distance AD that is equal to or larger than 4.5 mm.

Figure 8:
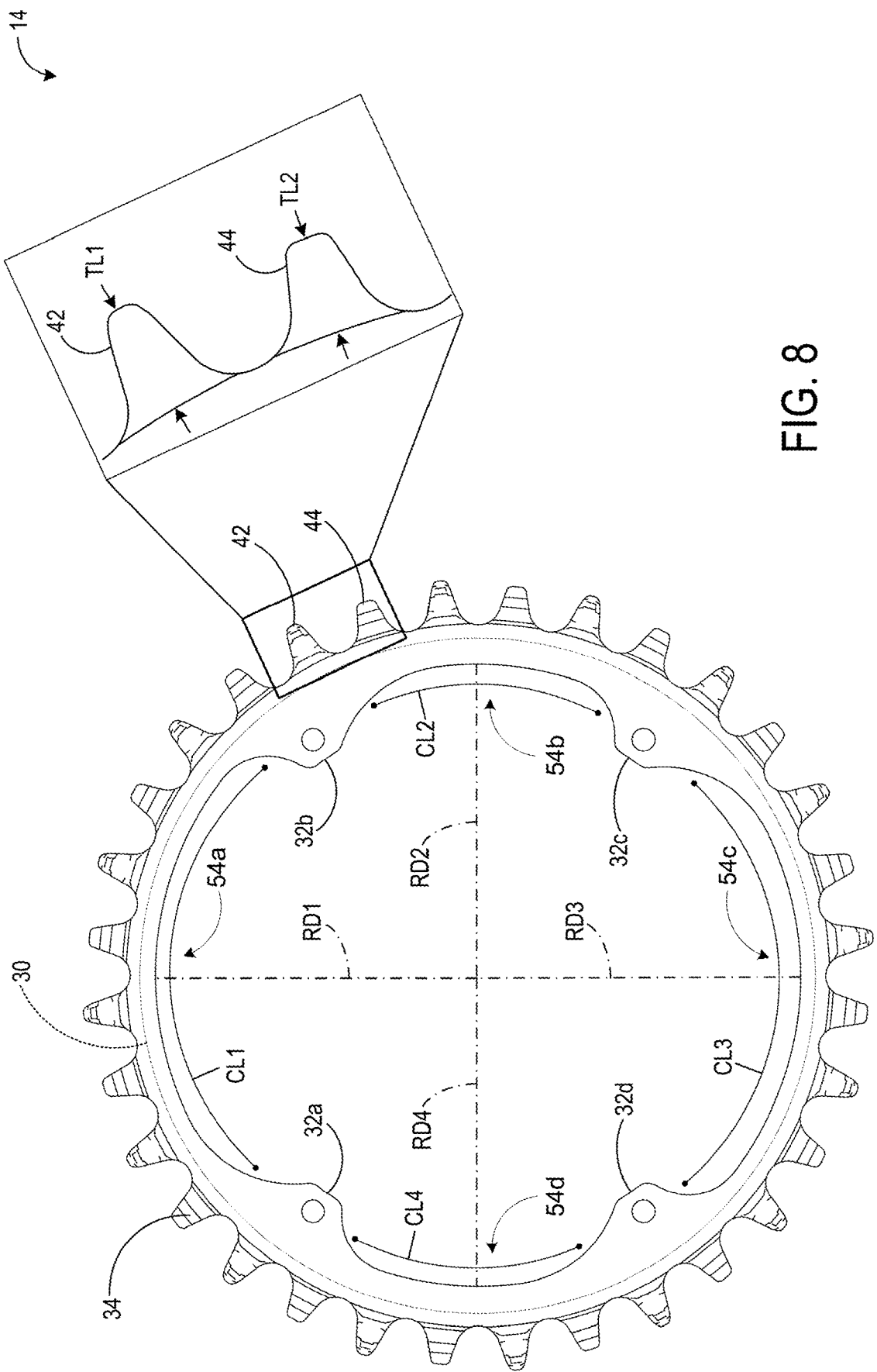
FIG. 8 is a right side view of a tooth ring according to the present disclosure.
Figure 9:
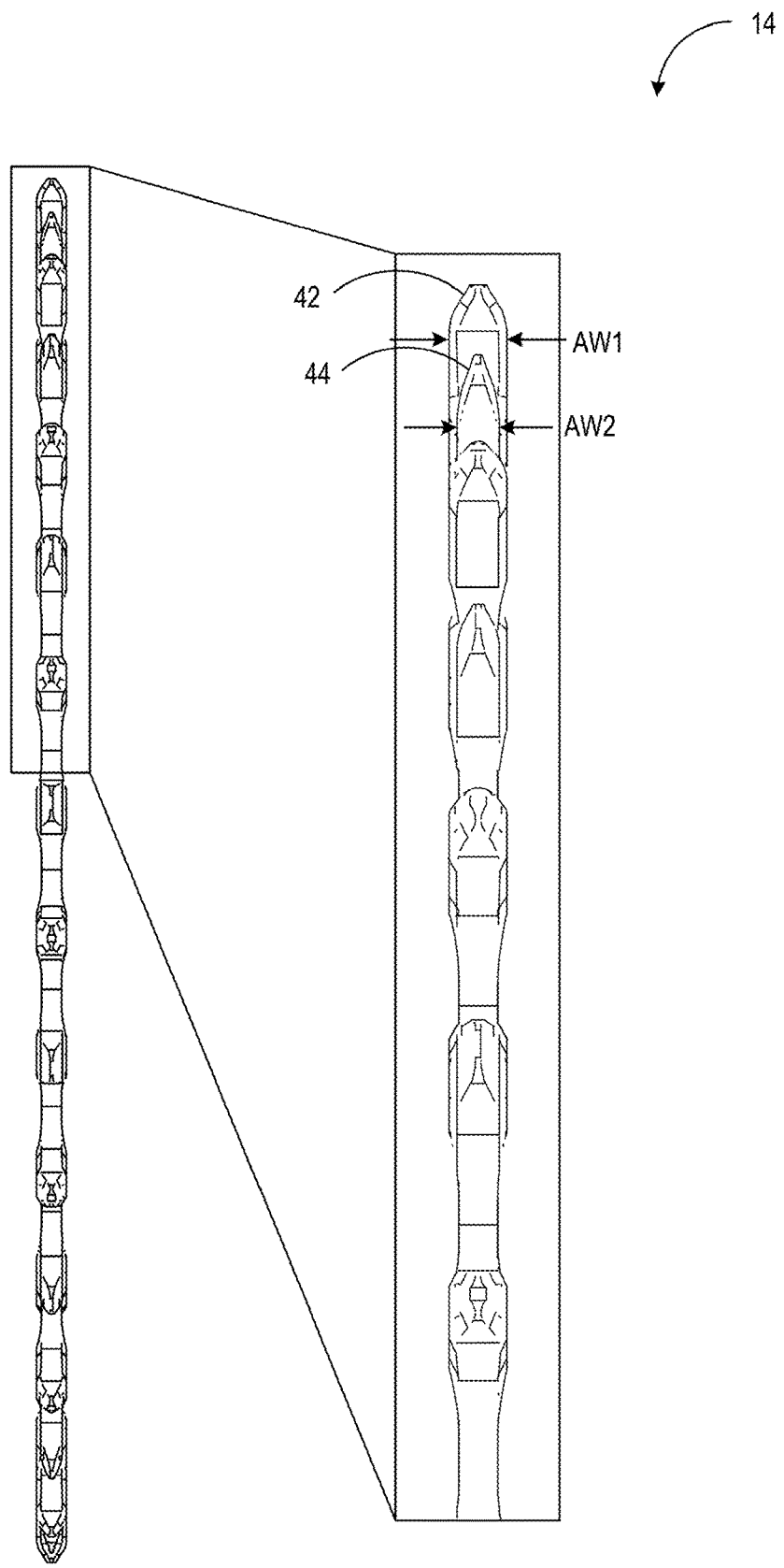
FIG. 9 is a rear view of a tooth ring according to the present disclosure.

FIG. 8 shows a right side view of the tooth ring 14. As discussed above, the tooth ring 14 includes the plurality of chain-driving teeth 34, which extend radially outward from the annular portion 30 to engage with the bicycle chain 9. The plurality of chain-driving teeth 34 includes narrow and wide teeth. Accordingly, the plurality of chain-driving teeth 34 includes at least one first tooth 42 and at least one second tooth 44. The second tooth 44 is axially narrower and radially shorter than the first tooth 42 with respect to the axial direction. Turning briefly to FIG. 9, a rear view of the tooth ring 14 is shown. A boxed region of the tooth ring 14 is enlarged to illustrate differences between the first tooth 42 and the second tooth 44 with regard to width in an axial direction parallel to the rotational center axis A1. The first tooth 42 has a first chain-engaging axial width AW1, and the second tooth 44 has a second chain-engaging axial width AW2. The second chain-engaging axial width AW2 is smaller than the first chain-engaging axial width AW1.

Continuing with FIG. 8, a boxed region of the tooth ring 14 is enlarged to show an exemplary first tooth 42 and second tooth 44. As illustrated, the first tooth 42 has a first maximum radial tooth length TL1, and the second tooth 44 has a second maximum radial tooth length TL1 that is smaller than the first maximum radial tooth length TL1. With a profile that is taller and wider than the second tooth 44, the first tooth 42 is configured to engage an outer link of the bicycle chain 9, and the alternation of narrow and wide teeth prevents the bicycle chain 9 from dropping from the bicycle sprocket 10.

As discussed above, the tooth ring 14 includes the annular portion 30 and the plurality of tooth ring attachment portions 32. The plurality of tooth-ring attachment portions 32 includes a first attachment portion 32a, a second attachment portion 32b, and a third attachment portion 32c. As shown in FIG. 8, the second attachment portion 32b is disposed between the first attachment portion 32a and the third attachment portion 32c in a circumferential direction with respect to the rotational center axis A1. The tooth ring attachment portions 32a, 32b, 32c define inner peripheries 54 of the annular portion 30 of the tooth ring 14. A first inner periphery 54a is disposed between the first attachment portion 32a and the second attachment portion 32b in the circumferential direction, and a second inner periphery 54b is disposed between the second attachment portion 32b and the third attachment portion 32c in the circumferential direction. The first inner periphery 54a has a first circumferential length CL1, and the second inner periphery 54b has a second circumferential length CL2 that is smaller than the first circumferential length CL1.

Radial distances RD between the rotational center axis A1 and the inner peripheries are indicated by dashed-dot lines in FIG. 8. A first radial distance RD1 is defined from the rotational center axis A1 to the first inner periphery 54a in a radial direction with respect to the rotational center axis A1, and a second radial distance RD2 is defined from the rotational center axis A1 to the second inner periphery 54b in the radial direction. The first radial distance RD1 is different from the second radial distance RD2. In the illustrated embodiment, the first radial distance RD1 is larger than the second radial distance RD2.

As shown in FIG. 8, the plurality of tooth-ring attachment portions 32 further includes a fourth attachment portion 32d disposed between the third attachment portion 32c and the first attachment portion 32a in the circumferential direction. Accordingly, the fourth attachment portion 32d defines a third inner periphery 54c and a fourth inner periphery 54d of the annular portion 30 of the tooth ring 14. The third inner periphery 54c is disposed between the third attachment portion 32c and the fourth attachment portion 32d in the circumferential direction, and the fourth inner periphery 54d is disposed between the fourth attachment portion 32d and the first attachment portion 32a in the circumferential direction. The third inner periphery 54c has a third circumferential length CL3, and the fourth inner periphery 54d has a fourth circumferential length CL4 that is smaller than the third circumferential length CL3.

A third radial distance RD3 is defined from the rotational center axis A1 to the third inner periphery 54c in the radial direction, and a fourth radial distance RD4 is defined from the rotational center axis A1 to the fourth inner periphery 54d in the radial direction. The third radial distance RD3 is equal to the first radial distance RD1, and the fourth radial distance RD4 is equal to the second radial distance RD2. As such, the third radial distance RD3 is different from the fourth radial distance RD4. In the illustrated embodiment, the third radial distance RD3 is larger than the fourth radial distance RD4.

Figure 10:
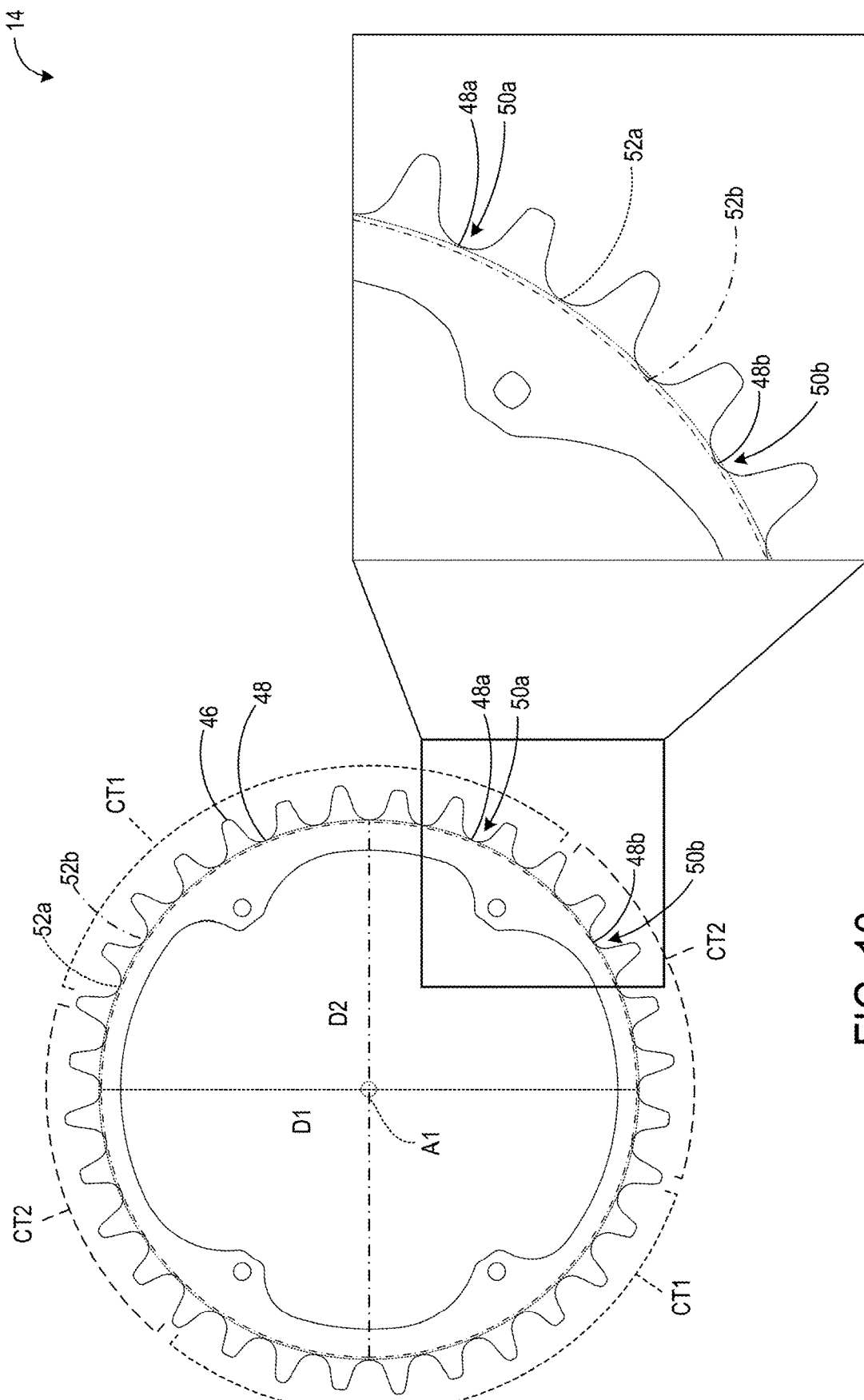
FIG. 10 is a right side view of a tooth ring according to the present disclosure.

FIG. 10 shows a right side view of the tooth ring 14. The plurality of chain-driving teeth 34 includes a plurality of tooth tip portions 46 and a plurality of tooth bottom portions 48. Each of the plurality of tooth bottom portions 48 is located between a pair of tooth tip portions 46 adjacent to each other in a circumferential direction with respect to the rotational center axis A1. The plurality of tooth bottom portions 48 includes at least one first tooth bottom portion 48a and at least one second tooth bottom portion 48b. The first tooth bottom portion 48a has a first tooth bottom shape 50a that is different from a second tooth bottom shape 50b defined by the second tooth bottom portion 48b. The first and second tooth bottom shapes 50a, 50b are arranged in separate regions of the tooth ring 14 according to chain tension during driving the bicycle sprocket 10. As a consequence of engagement with the bicycle chain 9 as it is positioned on various rear sprockets, the tooth ring 14 can be divided into circumferential regions based on levels of chain tension experienced in those regions. These regions are defined in FIG. 10 as first chain tension regions CT1 and second chain tension regions CT2. As illustrated, the tooth ring 14 has two CT1 regions indicated by small dashed lines and two CT2 regions indicated by large dashed lines, with regions of like chain tension arranged opposite one another. The two first chain tension regions CT1 are alternatingly disposed between the two second chain tension regions CT2. The first chain tension regions CT1 experience increased levels of chain tension, and it is desirable for the first tooth bottom portions 48a in these regions to have a shallower tooth bottom with a first tooth bottom shape 50a to improve the strength of the tooth ring 14. The second chain tension regions CT2 experience less chain tension than the first chain tension regions CT1; thus, the second tooth bottom portions 48b are designed with a deeper tooth bottom that has a second tooth bottom shape 50b and can efficiently eliminate mud from the tooth ring 14. As such, the tooth ring 14 is configured to balance strength with mud removal.

As illustrated in FIG. 10, the first tooth bottom shape 50a defines a first tooth bottom circle 52a with a first diameter D1, and the second tooth bottom shape 50b defines a second tooth bottom circle 52b with a second diameter D2 that is smaller than the first diameter D1. The first tooth bottom circle 52a is indicated by a dotted line in FIG. 10. The second tooth bottom circle 52b is indicated by a dashed-dot line. A boxed portion of the tooth ring 14 in FIG. 10 is enlarged to illustrate differences in size between the first and second tooth bottom circles 52a, 52b. As shown, the second tooth bottom circle 52b has a smaller second diameter D2 that fits within the first diameter D1 of the first tooth bottom circle 52a.

Figure 11:
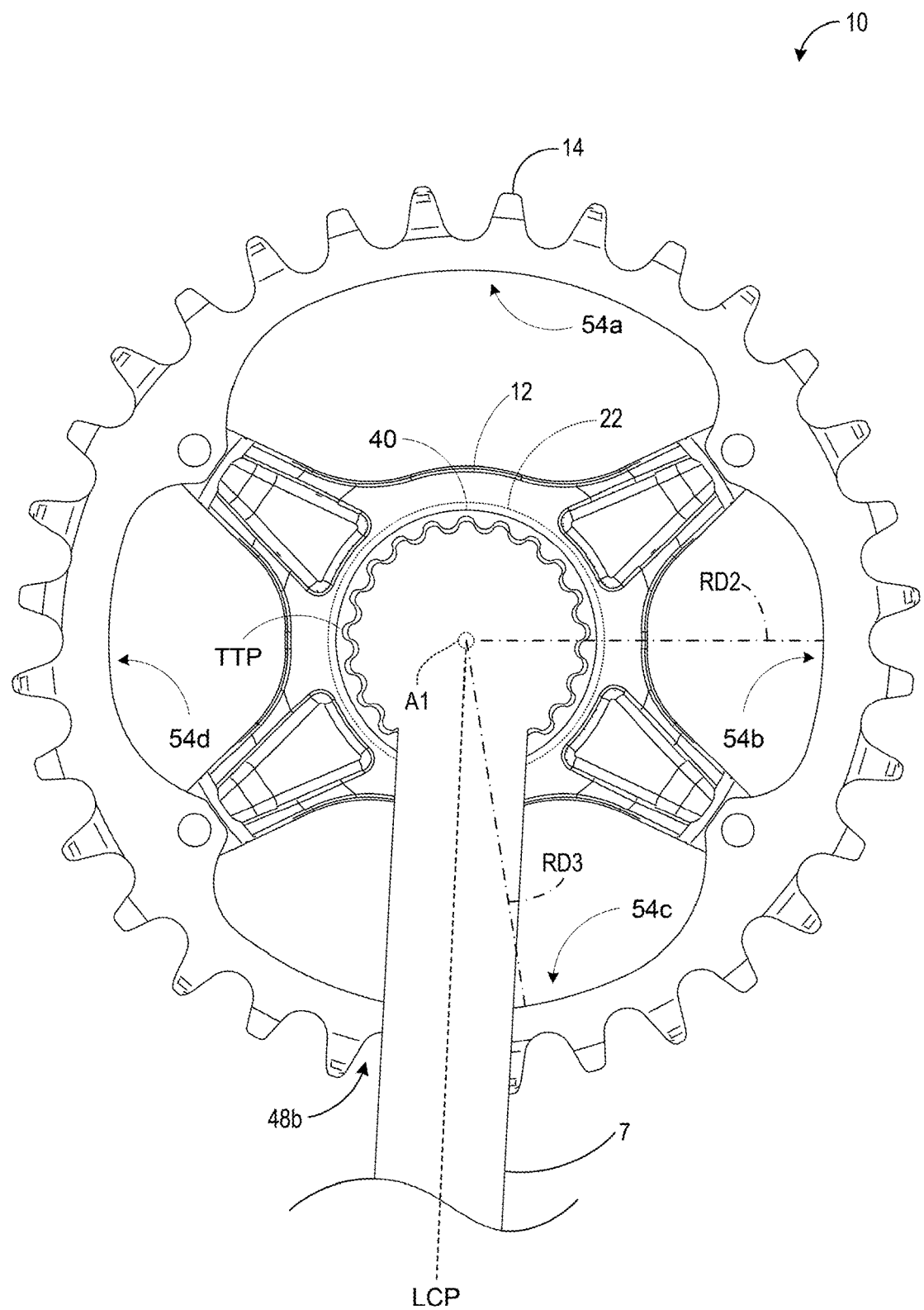
FIG. 11 is a right side view of a crank arm mounted to a bicycle sprocket according to the present disclosure.

FIG. 11 shows a right side view of a crank arm mounted to a bicycle sprocket according to the present disclosure. As discussed above, the central portion 22 of the sprocket body 12 has splines that form the torque transmitting profile TTP. When the bicycle sprocket 10 is mounted to the bicycle frame 2 and the crank arm 7 is mounted to the bicycle sprocket 10, the axial abutment surface 40 of the sprocket body 12 is configured to abut the crank arm 7 in the axial direction. The torque transmitting profile TTP engages with the crank arm 7 to transfer a pedaling force from the pedals 6 to rotate the bicycle sprocket 10.

As shown, the crank arm 7 is mounted to the sprocket body 12 in a manner such that the crank arm 7 extends from the rotational center axis A1 toward the third inner periphery 54c in the radial direction as viewed from an axial direction with respect to the rotational center axis A1. The first inner periphery 54a, the second inner periphery 54b, the third inner periphery 54c, and the fourth inner periphery 54d are symmetrically formed with respect to a longitudinal center plane LCP of the crank arm 7. The longitudinal center plane LCP is defined to include the rotational center axis A1 and a pedal axis defined by a pedal spindle attached to the crank arm 7. Accordingly, the second radial distance RD2 is smaller than the third radial distance RD3, as indicated by the dashed-dot lines in FIG. 11. In the illustrated assembled state where the crank arm 7 is mounted to the bicycle sprocket 10, at least one second tooth bottom portion 48b is disposed to overlap with the crank arm 7 as viewed from an axial direction with respect to the rotational center axis A1. This configuration arranges the crank arm 7 in a position such that a stronger pedaling force is applied at the first chain tension regions CT1 of the tooth ring 14 that have increased strength than the second chain tension regions CT2.

While only selected embodiments have been chosen to illustrate the present invention, it will be apparent to those skilled in the art from this disclosure that various changes and modifications can be made herein without departing from the scope of the invention as defined in the appended claims. For example, the size, shape, location, or orientation of the various components can be changed as needed and/or desired. Components that are shown directly connected or contacting each other can have intermediate structures disposed between them. The functions of one element can be performed by two elements, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

The invention claimed is:

1. A bicycle sprocket comprising:
a sprocket body made of a first material, the sprocket body having a rotational center axis, the sprocket body including:
   a central portion having a central opening through which the rotational center axis passes, and
   a plurality of arm portions extending radially outward from the central portion with respect to the rotational center axis, each of the arm portions including a sprocket body attachment portion;
a tooth ring made of a second material that is different from the first material, the tooth ring including:
   an annular portion including a plurality of tooth-ring attachment portions, and
   a plurality of chain-driving teeth extending radially outward from the annular portion to engage with a bicycle chain; and
at least one non-threaded fastener fixedly connecting the sprocket body attachment portion and to a corresponding tooth ring attachment portion, wherein
the plurality of chain-driving teeth includes a plurality of tooth bottom portions, each of the plurality of tooth bottom portions being located between a pair of tooth tip portions adjacent to each other in a circumferential direction with respect to the rotational center axis,
the plurality of tooth bottom portions includes at least one first tooth bottom portion having a first tooth bottom shape and at least one second tooth bottom portion having a second tooth bottom shape, and
the at least one second tooth bottom portion is disposed to overlap with a crank arm in an assembled state where the crank arm is mounted to the bicycle sprocket.

2. The bicycle sprocket according to claim 1, wherein
the sprocket body has a first side surface and a second side surface opposite to the first side surface in an axial direction with respect to the rotational center axis,
the annular portion of the tooth ring is attached to the first side surface, and
the second side surface is configured to face an axial center plane of a bicycle frame in a mounting state where the bicycle sprocket is mounted to the bicycle frame.

3. The bicycle sprocket according to claim 1, wherein
the sprocket body attachment portion has an axially recessed attachment surface on which the tooth-ring attachment portion is mounted.

4. The bicycle sprocket according to claim 3, wherein
the central portion of the sprocket body has an axial abutment surface configured to abut the crank arm, and
the axially recessed attachment surface is offset from the axial abutment surface in an axial direction with respect to the rotational center axis by an axial distance that is equal to or larger than 4.5 mm.

5. The bicycle sprocket according to claim 1, wherein
the plurality of tooth-ring attachment portions includes a first attachment portion, a second attachment portion, and a third attachment portion,
the second attachment portion is disposed between the first attachment portion and the third attachment portion in the circumferential direction with respect to the rotational center axis,
the annular portion of the tooth ring has a first inner periphery and a second inner periphery,
the first inner periphery is disposed between the first attachment portion and the second attachment portion in the circumferential direction,
the second inner periphery is disposed between the second attachment portion and the third attachment portion in the circumferential direction,
a first radial distance is defined from the rotational center axis to the first inner periphery in a radial direction with respect to the rotational center axis,
a second radial distance is defined from the rotational center axis to the second inner periphery in the radial direction, and
the first radial distance is different from the second radial distance.

6. The bicycle sprocket according to claim 5, wherein
the plurality of tooth-ring attachment portions further includes a fourth attachment portion disposed between the third attachment portion and the first attachment portion in the circumferential direction, the annular portion of the tooth ring has a third inner periphery and a fourth inner periphery, the third inner periphery is disposed between the third attachment portion and the fourth attachment portion in the circumferential direction, the fourth inner periphery is disposed between the fourth attachment portion and the first attachment portion in the circumferential direction, a third radial distance is defined from the rotational center axis to the third inner periphery in the radial direction, a fourth radial distance is defined from the rotational center axis to the fourth inner periphery in the radial direction, the third radial distance is equal to the first radial distance, and the fourth radial distance is equal to the second radial distance.

7. The bicycle sprocket according to claim 6, wherein
the crank arm is mounted to the sprocket body in a manner such that the crank arm extends from the rotational center axis toward the third inner periphery in the radial direction as viewed from an axial direction with respect to the rotational center axis, and the second radial distance is smaller than the third radial distance.

8. The bicycle sprocket according to claim 7, wherein
the first inner periphery, the second inner periphery, the third inner periphery, and the fourth inner periphery are symmetrically formed with respect to a longitudinal center plane of the crank arm.

9. The bicycle sprocket according to claim 8, wherein
the first inner periphery has a first circumferential length, the second inner periphery has a second circumferential length that is smaller than the first circumferential length, the third inner periphery has a third circumferential length, and the fourth inner periphery has a fourth circumferential length that is smaller than the third circumferential length.

10. The bicycle sprocket according to claim 1, wherein
the central portion of the bicycle sprocket has a torque transmitting profile configured to engage with one of the crank arm and a crank axle.

11. The bicycle sprocket according to claim 1, wherein
the first material has a first wear resistance, and
the second material has a second wear resistance that is greater than the first wear resistance.

12. The bicycle sprocket according to claim 1, wherein
the first material is selected from the group consisting of aluminum and plastic.

13. The bicycle sprocket according to claim 1, wherein
the second material is selected from the group consisting of steel, titanium and aluminum.

14. The bicycle sprocket according to claim 1, further comprising
at least one non-metallic cover concealing the at least one non-threaded fastener.

15. A bicycle sprocket comprising:
a sprocket body having a rotational center axis, a first side surface, and a second side surface opposite to the first side surface in an axial direction with respect to the rotational center axis, the second side surface being configured to face an axial center plane of a bicycle frame in a mounting state where the bicycle sprocket is mounted to the bicycle frame, the sprocket body including:
a central portion having a central opening through which the rotational center axis passes, and
a plurality of arm portions extending radially outward from the central portion with respect to the rotational center axis, each of the arm portions including a sprocket body attachment portion; and
a tooth ring separately provided from the sprocket body, the tooth ring including:
an annular portion including a plurality of tooth ring attachment portions non-detachably attached to sprocket body attachment portions, the annular portion of the tooth ring being attached to the first side surface of the sprocket body, and
a plurality of chain-driving teeth extending radially outward from the annular portion to engage with a bicycle chain, wherein
the plurality of chain-driving teeth includes a plurality of tooth bottom portions, each of the plurality of tooth bottom portions being located between a pair of tooth tip portions adjacent to each other in a circumferential direction with respect to the rotational center axis,
the plurality of tooth bottom portions includes at least one first tooth bottom portion having a first tooth bottom shape and at least one second tooth bottom portion having a second tooth bottom shape, and
the at least one second tooth bottom portion is disposed to overlap with a crank arm in an assembled state where the crank arm is mounted to the bicycle sprocket.

16. A bicycle sprocket comprising:
a sprocket body made of a first material, the sprocket body having a rotational center axis, the sprocket body including:
a central portion having a central opening through which the rotational center axis passes, and
a plurality of arm portions extending radially outward from the central portion with respect to the rotational center axis, each of the arm portions including a sprocket body attachment portion; and
a tooth ring made of a second material that is different from the first material, the tooth ring including:
an annular portion including a plurality of tooth ring attachment portions, and
a plurality of chain-driving teeth extending radially outward from the annular portion to engage with a bicycle chain, the plurality of chain-driving teeth including at least one first tooth having a first chain-engaging axial width and at least one second tooth having a second chain-engaging axial width that is smaller than the first chain-engaging axial width, wherein
the at least one first tooth has a first maximum radial tooth length, and the at least one second tooth has a second maximum radial tooth length that is smaller than the first maximum radial tooth length,
the plurality of chain-driving teeth further includes a plurality of tooth bottom portions, each of the plurality of tooth bottom portions being located between a pair of tooth tip portions adjacent to each other in a circumferential direction with respect to the rotational center axis,
the plurality of tooth bottom portions includes at least one first tooth bottom portion having a first tooth bottom shape and at least one second tooth bottom portion having a second tooth bottom shape, and the at least one second tooth bottom portion is disposed to overlap with a crank arm in an assembled state where the crank arm is mounted to the bicycle sprocket.

17. The bicycle sprocket according to claim 16, wherein an axially recessed attachment surface of the sprocket body attachment portion is configured to face away from an axial center plane of a bicycle frame in a mounting state where the bicycle sprocket is mounted to the bicycle frame.

18. A bicycle sprocket having a rotational center axis, the bicycle sprocket comprising:
 a plurality of chain-driving teeth including:
  at least one first tooth having a first chain-engaging axial width and at least one second tooth having a second chain-engaging axial width that is smaller than the first chain-engaging axial width; and
  a plurality of tooth tip portions and a plurality of tooth bottom portions, wherein
 each of the plurality of tooth bottom portions is located between a pair of tooth tip portions adjacent to each other in a circumferential direction with respect to the rotational center axis;
 the plurality of tooth bottom portions includes at least one first tooth bottom portion having a first tooth bottom shape and at least one second tooth bottom portion having a second tooth bottom shape;
 the first tooth bottom shape is different from the second tooth bottom shape;
 the first tooth bottom shape defines a first tooth bottom circle with a first diameter;
 the second tooth bottom shape defines a second tooth bottom circle with a second diameter that is smaller than the first diameter; and
 the at least one second tooth bottom portion is disposed to overlap with a crank arm in an assembled state where the crank arm is mounted to the bicycle sprocket.

19. A bicycle sprocket having a rotational center axis, the bicycle sprocket comprising:
 a plurality of chain-driving teeth including a plurality of tooth tip portions and a plurality of tooth bottom portions, wherein
 each of the plurality of tooth bottom portions is located between a pair of tooth tip portions adjacent to each other in a circumferential direction with respect to the rotational center axis;
 the plurality of tooth bottom portions includes at least one first tooth bottom portion having a first tooth bottom shape and at least one second tooth bottom portion having a second tooth bottom shape;
 the first tooth bottom shape is different from the second tooth bottom shape;
 the first tooth bottom shape defines a first tooth bottom circle with a first diameter;
 the second tooth bottom shape defines a second tooth bottom circle with a second diameter that is smaller than the first diameter; and
 the at least one second tooth bottom portion is disposed to overlap with a crank arm in an assembled state where the crank arm is mounted to the bicycle sprocket.

* * * * *